United States Patent [19]
Lenz et al.

[11] Patent Number: 5,558,115
[45] Date of Patent: Sep. 24, 1996

[54] VALVE POSITIONER WITH PRESSURE FEEDBACK, DYNAMIC CORRECTION AND DIAGNOSTICS

[75] Inventors: Gary A. Lenz, Eden Prairie; Gregory C. Brown, Minnetonka; Jogesh Warrior, Chanhassen, all of Minn.

[73] Assignee: Rosemount Inc., Eden Prairie, Minn.

[21] Appl. No.: 481,085

[22] Filed: Jun. 7, 1995

Related U.S. Application Data

[62] Division of Ser. No. 112,694, Aug. 25, 1993.

[51] Int. Cl.$^6$ ................................................ F16K 37/00
[52] U.S. Cl. .......................... 137/86; 137/486; 137/487.5
[58] Field of Search ................................ 137/486, 487.5, 137/86

[56] References Cited

U.S. PATENT DOCUMENTS

| | | |
|---|---|---|
| 2,769,943 | 11/1956 | Matthews . |
| 3,575,209 | 4/1971 | Kast . |
| 4,164,167 | 8/1979 | Imai et al. . |
| 4,492,246 | 1/1985 | Prescott et al. . |
| 4,585,029 | 4/1986 | Harding . |

(List continued on next page.)

FOREIGN PATENT DOCUMENTS

| | | |
|---|---|---|
| 0462432A2 | 12/1991 | European Pat. Off. . |
| 2439030 | 4/1975 | Germany . |

OTHER PUBLICATIONS

"Digital Control Valves," H. F. Frieland et al, *ISA Transactions*, 1969, vol. 8, No. 4, pp. 251–265.

"Benefits of Process Measurement and Intelligence in the Final Control Element," K. Beatty, Valtek International, (undated), pp. 255–262.

"Intelligent Valve Based Process Sensing and Control," K. Beatty, *Advances in Instrumentation and Control ISA/91*, vol. 46, Part 2, Oct. 27–31, 1991 pp. 1175–1185.

"The Smart Valve, " D. E. O'Hara, *Industrial Applications of Fluid Mechanics,* American Society of Mechanical Engineers, Winter Meeting Nov. 25–30, 1990, FED–vol. 100, pp. 95–99.

(List continued on next page.)

*Primary Examiner*—Kevin Lee
*Attorney, Agent, or Firm*—Westman, Champlin & Kelly, P.A.

[57] ABSTRACT

In this invention, a valve positioner receives a setpoint from a master and provides a control pressure to a valve actuator for controlling a valve. A sensing circuit in the positioner senses the position of the valve and the control pressure, and a control circuit in the positioner uses both the sensed pressure and position to provide a command output to a pneumatic section which produces the control pressure. In another embodiment of the invention, a positioner receives a setpoint from a master and provides a control pressure to a valve actuator for controlling a valve. A sensing circuit in the positioner senses the valve position and pneumatics in the positioner provide the control pressure as a function of the sensed position and an output from a control circuit within the positioner. The positioner includes a diagnostic circuit which stores a valve attribute and provides a diagnostic output as a function of the stored valve characteristic and a selected one of the sensed variables. In another embodiment of the invention, a positioner includes a correction circuit for storing a valve attribute affected by one of a set of physical parameters and for receiving a selected one of the set of sensed physical parameters. The correction means compensates a command output from a control circuit as a function of the sensed physical parameter and the stored valve characteristic. In another embodiment, the positioner includes a benchset control circuit which ramps the control pressure between an initial control pressure and a final control pressure and back to the initial control pressure, while sampling specific control pressures and their corresponding positions, in order to provide an output indicating the proper spring preload force on an actuator spring.

7 Claims, 7 Drawing Sheets

U.S. PATENT DOCUMENTS

| | | |
|---|---|---|
| 4,665,938 | 5/1987 | Brown et al. . |
| 4,672,997 | 6/1987 | Landis et al. . |
| 4,712,173 | 12/1987 | Fujiwara . |
| 4,845,416 | 7/1989 | Scholl et al. .................. 251/30.01 X |
| 4,976,144 | 12/1990 | Fitzgerald .................. 137/487.5 X |
| 5,146,941 | 9/1992 | Statler . |
| 5,197,328 | 3/1993 | Fitzgerald . |
| 5,251,148 | 10/1993 | Haines et al. . |
| 5,325,884 | 7/1994 | Mirel et al. . |

OTHER PUBLICATIONS

Masoneilan Fieldbus Operated Control valve undated product data sheet, presented at the European trade show Apr. 1992.

Intelligent Positioner, ISA 1991 conference Proceedings, dr. Rudiger Kaspers XOMOX Matryx MX75E Electropneumatic Valve Positioner data sheet, dated Sep. 1990.

REXA X–PAC, L series Linear Actuators, bulletin XLS2, dated Jul. 1991.

REXA X–PAC, theory of Operation, Bulletin XCT1, dated Jan. 1990.

Rosemount Product Data Sheet PDS 4594, dated Mar. 1993 for Model 3311 Current–to–Pressure Transducer.

Unit 2 on control valves, from *Control Valve Selection and Sizing* by Les Kriskell, reprinted with permission from Instrument Society of America.

Fisher Bulletin 50:010 dated Apr. 1991, entitled "Corrosive Service control valve package".

"Comparison of Kytronics Digital Positioner Systems and Standard Electropheumatic Positioner Systems".

"MCDLU Positioner Systems" Jan. 1992.

"DLU Positioner Systems".

"Smart Digital Positioners".

"Select–A –Range II".

"Reasons to use Kytronics Smart Digital Positioners".

Brochure: "ICoT Smart Positioner," ICoT Systems Corporation, Sallebrook, New Jersey 07662, ,distributed at Instrument Society of America Trade Show, Chicago, Illinois, Sep. 20–24, 1993. Second paragraph on page 2 of brochure refers to patent pending. Applicants have no further information regarding any pending applications.

Brochure: "KyTRONICS Smart Digital Positioners," Kytronics, Inc., Prospect, Kentucky 40059, Mar. 1992.

"Valtek Introduces First Smart System for Control Valves".

PDS57–120782, assigned to Yamatake Honeywell, full translation, disclosure date Jun. 13, 1989.

PDH1–150085 by Sonoda et al., disclosure date Jun. 13, 1989.

UDS62–40377 by Yuken, disclosure Mar. 10, 1987.

UDS62–40613 by Yuken, disclosure date Mar. 11, 1987.

UDS62–40616 by Yuken, disclosure date Mar. 11, 1987.

PDH2–123406, assigned to Fushiman Co., disclosure date May 10, 1990.

PDH2–166357, assigned to Matsushita, Jun. 27, 1990.

UDS60–62117 assigned to Keihin Seiki, disclosure date May 1, 1985.

VALVE POSITIONER WITH PRESSURE FEEDBACK, DYNAMIC CORRECTION AND DIAGNOSTICS

This is a division of application Ser. No. 08/112,694, filed Aug. 25, 1993. Priority of the prior application is claimed pursuant to 35 USC § 120.

BACKGROUND OF THE INVENTION

This invention relates to a valve positioner for controlling a valve which affects a process variable and more particularly, to such valve positioners having microprocessors.

There is a desire to improve the accuracy, dynamic performance and stability with which valve positioners operate, and to provide real-time diagnostics to a control room, for quality auditing requirements and so that maintenance and plant down-time can be predicted rather than suffer emergency shutdowns or unnecessary planned valve maintenance.

Various types of positioners are used in the process control industry. Some positioners are mechanically coupled to an actuator while some incorporate the actuator within the positioner. The actuator provides means for physically positioning the valve and may be electric, hydraulic or pneumatic. Electric actuators have a current signal which drives a motor which positions the valve. Hydraulic actuators have oil-filled means for positioning the valve. By far the most common in the process control industry, a pneumatic actuator has a piston or a combination of a spring and diaphragm. Depending on the application and the level of control integration, positioners receive several types of input from a controller which are representative of the desired valve position. One type is a current input having a 4-20 mA or 10-50 mA magnitude, a second is a digital signal superimposed on the current signal and a third is a fully digital input such as Fieldbus or Modbus®. Alternatively, the positioner may receive a 3-15 pound per square inch (PSI) pneumatic input representative of the desired valve position. Depending on the level of integration and the application as well, positioners have different types of outputs. Some positioners provide an output current to a motor, while still others have a fast responding hydraulic output. The most common type of positioner output is a 0-200 PSI pneumatic output. Positioners, as the word is used in this application, includes all these field mounted instruments, including the various inputs and outputs, and their respective means for positioning valves, if applicable.

In the most common case of a spring and diaphragm actuator, the diaphragm deflects with the pressure delivered by the positioner, thereby exerting a force or torque on a control valve stem or rotary member, respectively, so as to change the position of the valve. Almost all positioners have a mechanical or an electronic position sensor to provide a position signal which is fed back into a microprocessor-based control section of the positioner. No matter what the specific means are for delivering force to position a valve, positioners having microprocessor based control algorithms are known. Existing positioners improve the loop dynamic response, but have a limited bandwidth so that their usage is limited to slow control loops such as one which controls level in a tank or temperature in a reactor.

One obstacle to ideal valve dynamic position control is that the valve characteristic (defined in this application as the relationship between flow and stem position or angle) deviates from the published valve characteristics by as much as five percent. Such non-ideality typifies all three major types of control valve characteristics: linear, equal percentage and quick opening. Furthermore, rotary and sliding stem valves may exhibit a nonlinear relationship between the actuator force provided to the valve and the flow through the valve, which is difficult for the inherently linear positioner to control even with the present valve stem position feedback. In fact, rotary valves have a non-monotonic torque vs. flow function as a result of the flow induced dynamic torque on the ball/butterfly in the valve. Everyday wear on valve components contributes to non-ideality in the control loop as well. In practice newly installed loops are "detuned", or purposefully assigned non-ideal control constants, to compensate for wear so that the loop remains stable over a wide variety of conditions. Compounding these issues of static and dynamic control accuracy, valve-related loop shutdowns are undesirable and expensive for industry.

The Electric Power Research Institute estimates that electric power utilities would save $400 million U.S. dollars if each control valve operated only one week longer each year. Most plants schedule regular maintenance shutdowns to monitor and repair valves, replace worn packing and worn out valve components so as to avoid even more costly and hazardous emergency shutdowns. Diagnostic systems which monitor valve integrity are known, but are generally configured to diagnose problems in valves disconnected from a process. One real-time control valve has limited diagnostics capability.

A positioner, control valve and actuator are assembled and properly configured for installation in a time consuming process called bench-setting. During benchset, an operator manually sets the valve's maximum travel position (called the stroke position), the minimum travel position (called the zero), limit stops and stiffness parameters. The process is iterative because the settings are not independent.

Thus, there is a need for a microprocessor-based valve positioner easily configurable at benchset, with increased bandwidth and improved dynamic positioning accuracy, which also has real-time diagnostics to provide valve and actuator integrity information.

SUMMARY OF THE INVENTION

In this invention, a valve positioner provides a control pressure to a valve actuator mechanically coupled to a valve as a function of a signal representative of the position of the valve, a desired position setpoint received from a controller and the time derivative of the sensed control pressure. The positioner includes receiving means connected to a current loop for receiving the setpoint, sensing means for sensing the valve position and the control pressure and transducer means for converting a supply of pneumatic air to the control pressure as a function of a command output received from a control circuit within the positioner. In another embodiment of the invention, a valve positioner has a control circuit with position feedback includes a sensing circuit for sensing a set of state variables related to the valve performance. The positioner includes a diagnostic circuit for storing an attribute of the valve and provides an output as a function of the stored valve attribute and a selected one of the state variables. Examples of stored valve attributes are position versus flow, torque versus position and torque versus flow curves. In another embodiment of the invention, the positioner includes a benchset control circuit which ramps the control pressure between an initial control pressure and a final control pressure and back to the initial control pressure, while, sampling specific control pressures and their corresponding positions, in order to provide an output indicating the proper spring preload force on an actuator spring. In another embodiment of the invention, a valve positioner has a control circuit having position feedback providing a command output to a transducer circuit which provides a control pressure as a function of the command output. The positioner includes a sensing circuit for sensing a set of state variables related to the valve performance. The positioner includes a correction circuit which stores a valve a tribute affected by one of the physical parameters and dynamically compensates the command output as a function of the sensed physical parameter and the stored valve attribute.

DETAILED DESCRIPTION OF THE PREFERRED EMBODIMENTS

Figure 1:
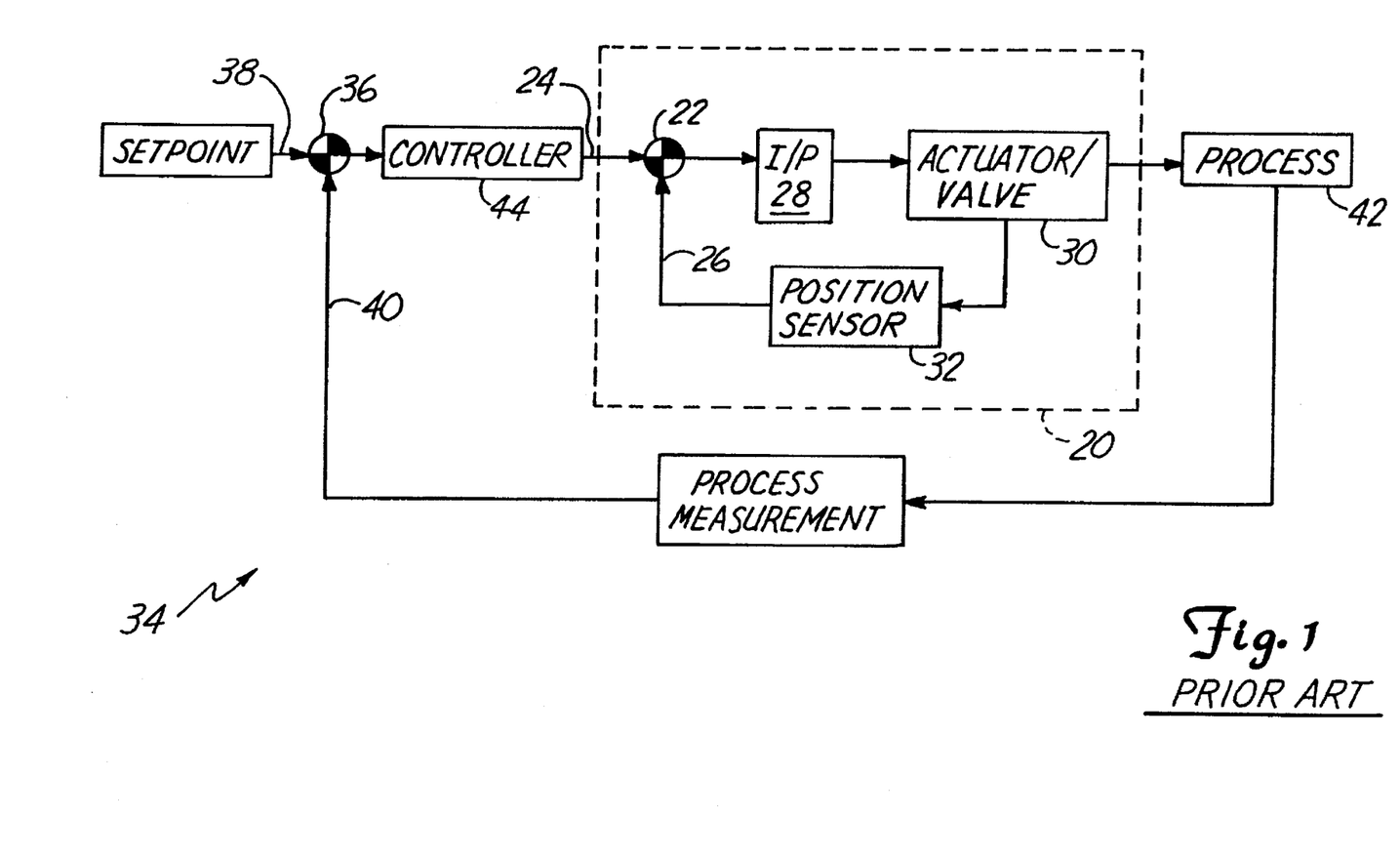
FIG. 1 is a control flow chart of a control loop including a prior art valve positioner.

Positioners are generally used in slower process control loops, such as level or temperature, to improve loop performance. A control diagram of a typical prior-art electropneumatic positioner is shown in FIG. 1, where an inner cascade loop 20 comprises an error generator 22 for generating a difference between a controller setpoint 24 and a position sensor feedback 26, a current-to-pressure converter 28, an actuator connected to a valve 30 and a position sensor 32. An outer loop, shown generally at 34, includes an error generator 36 for differencing a desired setpoint 38 and a measurement 40 representative of the state of the process 42, and a controller 44 in series with cascade loop 20 and process 42. The overall system shown in FIG. 1 is usually stable if the bandwidth of the positioner, shown as the cascade loop 20, is at least a factor of four times larger than the bandwidth of outer loop 34. For loops which are difficult to tune, the factor should be increased. Prior art loops are purposefully detuned, or tuned non-ideally, to provide stability over a wide range of operating conditions. In addition, it is desirable to minimize overshoot. For second order systems with proportional feedback in a typically underdamped system, however, the overshoot increases when bandwidth is increased.

Figure 2:
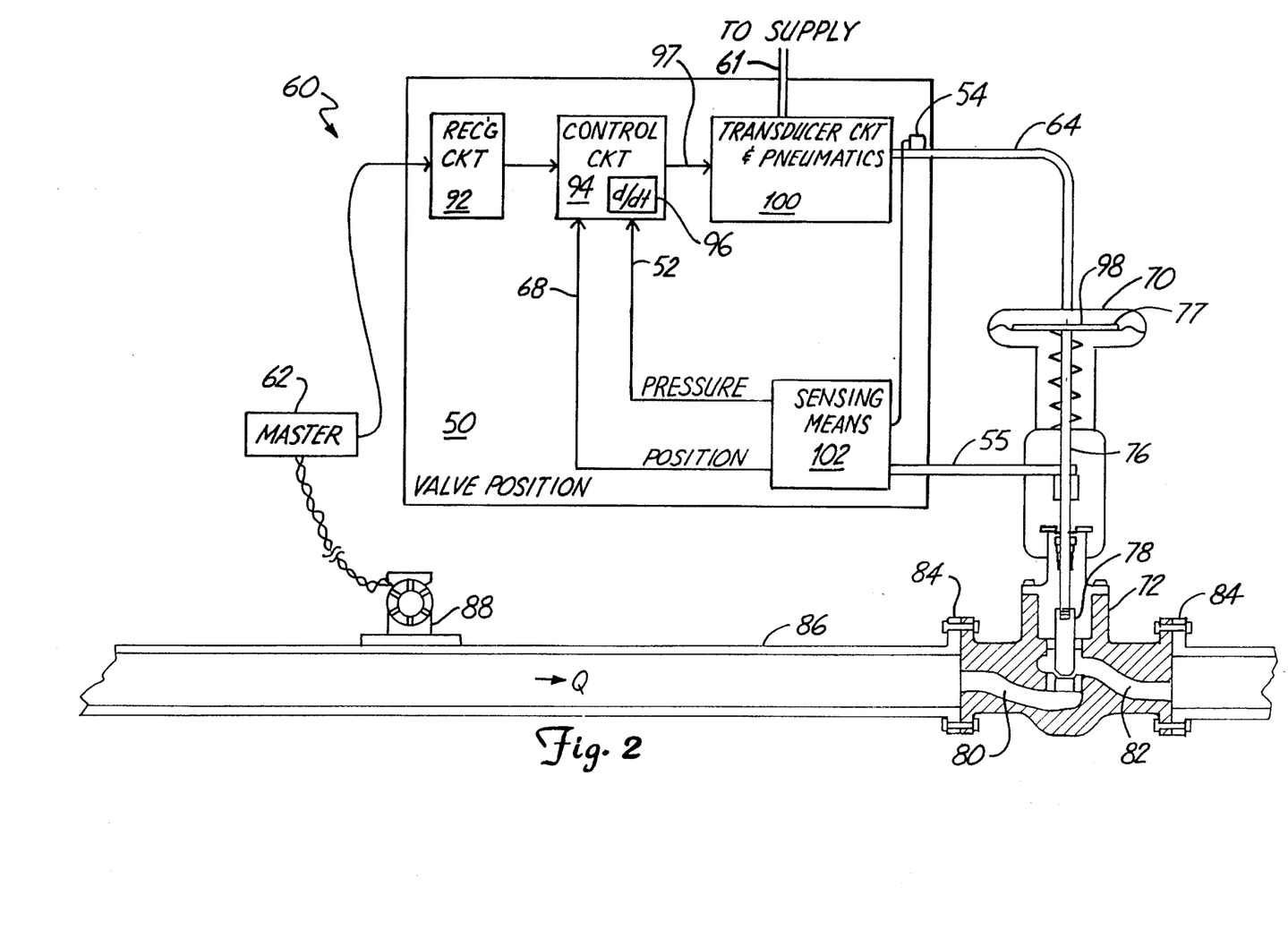
FIG. 2 is a block drawing of a valve positioner according to the present invention, connected to a master and an actuator mechanically coupled to a valve.

In a valve positioner 50 made according to the present invention and shown in FIG. 2, a derivative of the pressure feedback signal 52 provides the rate feedback required to decrease overshoot without affecting bandwidth. In other words, the amount of overshoot, which is well controlled by the amount of damping in the process loop, is reduced without decreasing the bandwidth of positioner 50, unlike the loop shown in FIG. 1. In FIG. 2, a process loop shown generally at 60 includes a master 62 located in a control room sending a desired valve position signal to valve positioner 50 over a two wire current loop, although other comunications loops, such as three and four wire current loops may be used. Positioner 50 receives a supply of pneumatic air 61 and provides a control pressure 64 as a function of the desired setpoint from master 62 and two variables: the derivative of the control pressure signal 52 and a sensed position signal 68. Control pressure 64 provides pressurized air to an actuator 70 mechanically connected to a linear stem control valve 72, although rotary valves are adaptable for use with the present invention. Actuator 70 has a diaphragm 71 which deflects when the pressurized control pressure air pushes against it, so as to urge stem 76 downwards. Stem 76 is fastened to a valve plug 78 which stops the flow between a first passageway 80 and a second passageway 82 when plug 78 is fully seated. Valve 72 is connected via flanges 84 to a pipe 86 carrying the flow Q. A transmitter 88 measures a flow Q and transmits a signal representative of the flow to master 62. Within positioner 50, a receiving circuit 92 receives a 4–20 mA signal from master 62, but may also receive the signal from a hand-held communicator. The magnitude of the current is representative of the desired valve position, but digital information including sensor selection commands and data may be superimposed on the current according to a protocol such as HART®, or with digital protocols such as DE, BRAIN®, Infinity or Modbus®. For critical control, position signal 68 is temperature compensated within a microprocessor. Alternatively, master 62 uses a fully digital protocol such as Fieldbus to communicate with positioner 50. This feature provides added flexibility and less wiring complexity over other schemes since the master need not recognize the need for the variable, request the process variable and subsequently transmit it to the field device which requires such variable. This direct communication of a process variable between transmitter 88 and positioner 50 significantly reduces delay in loop 60, making positioner 50 adapted for use in faster control loops such as ones which control flow.

A control circuit 94 provides a command output 97 as a function of the desired setpoint from circuit 92, the position signal 68 and pressure signal 52. A time derivative circuit 96 within circuit 94 provides a ram feedback signal, or in other words, a derivative of pressure signal 52 with respect to time for the control algorithm within circuit 94. It is preferable to use the pressure signal as the rate feedback signal because it is available as a diagnostic and/or dynamic error correction signal in other embodiments of the present invention, but a force or torque signal suffices. Control circuit 94 is preferably implemented in a low power CMOS microprocessor, or another appropriate technology offering improved power and bandwidth, using an adaptive control algorithm which makes use of available sensed signals such as pressure, position, force, packing and seat wear to fine tune PID constants, and thereby obviate loop detuning. Power consumption is a concern in all embodiments of the present invention, since positioner 50 operates wholly on the 4–20 mA at 10–15 VDC (9 mA at 9 V for Fieldbus) received from master 62. For this reason, capacitance and frequency at which digital logic in the positioner operates must be minimized. Even aside from capacitance and frequency concerns, positioner 50 minimizes power in that it incorporates a current to pressure transducer and a pneumatic positioner, both of which are 4–20 mA instruments. Therefore, valve control which previously consumed a maximum of 40 mA now consumes a maximum of 20 mA. A transducer and pneumatics circuit 100 receives a 0–200 PSI supply of air 61 and provides control pressure 64 as a function of the control signal from circuit 94, using a co-linear magnetic actuator and a deflected jet pilot stage as in Rosemount's Current to Pressure Transducer 3311 disclosed in U.S. Pat. No. 4,325,399 to Frick, owned by the same assignee as the present invention. Sensing means 102 senses signals from a pressure sensor 54 and a mechanical position sensor 55, digitizes the signals and provides both to control circuit 94.

In addition to the primary benefit of decreasing the overshoot without affecting the undamped natural frequency (and therefore the bandwidth), rate feedback has other advantages. Actuators have varying internal load volumes, shown generally at 98, which have a wide range of pneumatic compliances. Those actuators used with low flow valves with a relatively small diameter have a smaller compliance than do actuators used with larger control valves. In prior art positioners, the gain in the control algorithm had to be manually adjusted to accommodate varying load volumes to assure stability. However, the present invention, which is initially tuned to accommodate large actuator compliance, requires no gain adjustment for small compliances because the magnitude of the rate feedback is necessarily smaller for a small actuator. When the positioner is connected to an actuator with a small load volume, the rate of change of-pressure is large, so that the effective positioner loop gain is reduced during transients to prevent excessive overshoot, tinging and limit cycling. When the positioner is connected to an actuator with a large load volume, the rate of change of pressure is small, so that the effective positioner loop gain remains high during transients. By properly balancing the amount of pressure rate feedback with the proportional gain and integral action of the control algorithm, a large range of actuator load volumes are accommodated while maintaining minimal overshoot and minimizing bandwidth.

Figure 3:
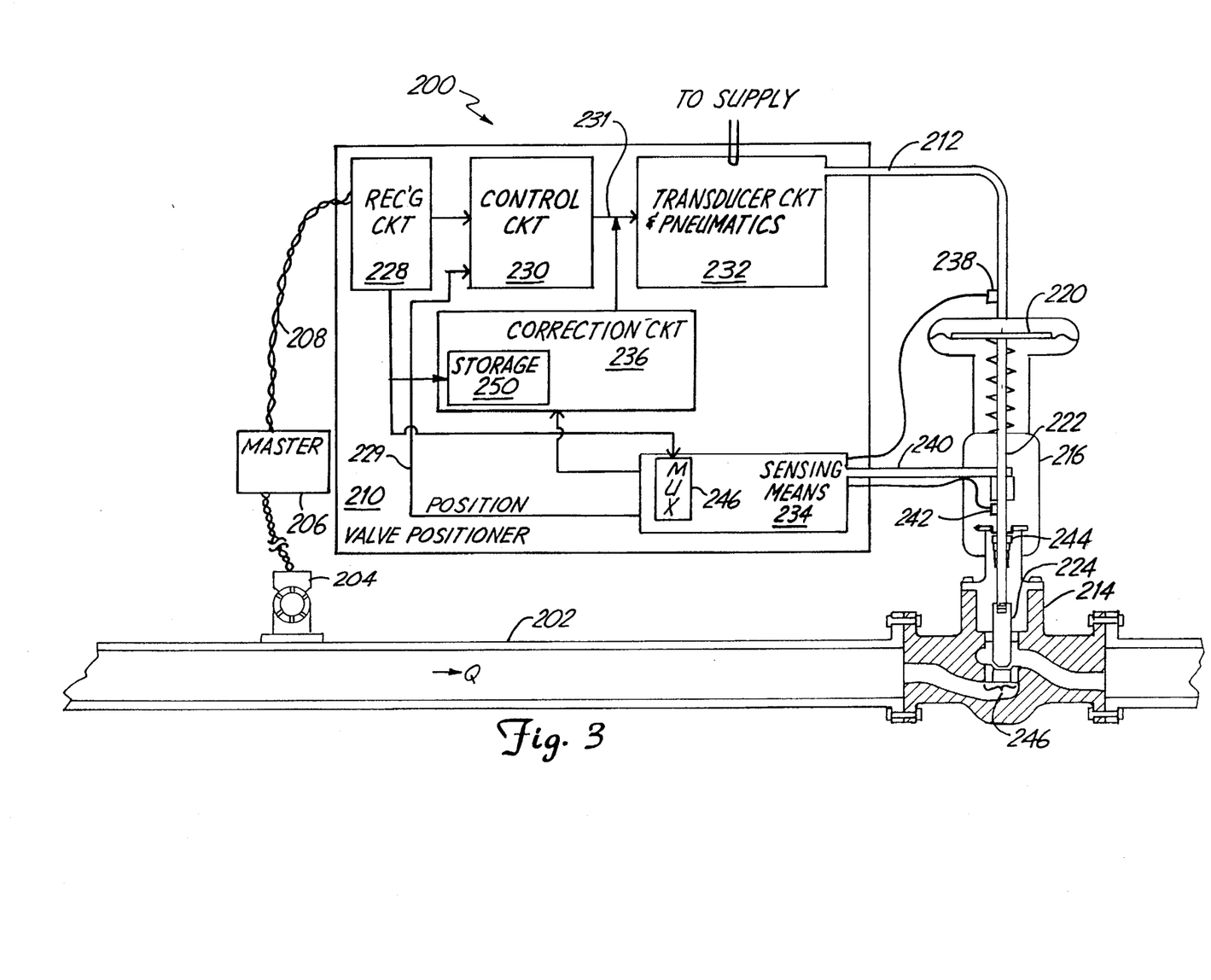
FIG. 3 is a block drawing of a valve positioner according to the present invention, connected to a master and an actuator mechanically coupled to a valve.

In FIG. 3, a control loop 200 controls the flow Q in a pipe 202. A transmitter 204 senses the flow and transmits a signal to a master controller 206 over a pair of twisted wires. Controller 206 sends a signal over another pair of twisted wires 208 to a valve positioner 210. Positioner 210 provides a control pressure 212 to a valve 214 through an actuator 216. A diaphragm 220 in actuator 216 deflects with the control pressure and exerts a spring force on a sliding stem 222 fastened to a valve plug 224 located in flow Q, thereby urging plug 224 to further obstruct and therefore lessen flow Q. In order to increase the flow, the control pressure is exhausted in order to allow the spring force to re-position plug 224 upwards.

Positioner 210 comprises a receiving circuit 228, a control circuit 230, a transducer circuit and pneumatics 232, a sensing circuit 234 and a correction circuit 236. Sensing circuit 234 is connected to a pressure sensor 238 for sensing the control pressure, a mechanical member 240 connected to stem 222 for sensing valve position, and a load cell 242 for sensing force or torque as appropriate. However, force or torque is preferably sensed by dividing the pressure sensor 238 output by the actuator diaphragm area, so as to reduce the cost, power consumption and complexity associated with load cell 242. For applications requiring fine control, the sensed force signal is modified by the air spring effect from the volume of air between the diaphragm and the case. For all embodiments of the present invention, a non-contact position sensor with a continuous output but without moving linkages, such as LVDT sensors, RVDT sensors, and Hail Effect sensors are most appropriate. A multiplexer circuit 246 selects which of the sensor inputs is supplied to correction circuit 236, as a function of a command received from receiving circuit 228.

Receiving circuit 228 receives a 4–20 mA signal from master 206, but may also receive the signal from a hand-held communicator. Circuit 228 operates in substantially the same way as circuit 92. Control circuit 230 receives a digital signal from circuit 228 representative of the desired valve position and a sensed position signal 229 representative of the valve position and provides an electrical control signal 231 as a function of appropriate PID constants set in circuit 230. Transducer and pneumatics circuit 232 receives a 0–200 PSI supply of air and uses standard current-to-pressure technology, as exemplified in Rosemount Current-to-Pressure Converter 3311 to provide control pressure 212 at the positioner nozzle.

Correction circuit 236 is preferably embodied in a low power CMOS microprocessor and includes a non-volatile storage 250 for storing an attribute of valve 214. In a first mode, generic information specific to valve 214 is stored in storage 250, such as its fully opened and fully closed positions, or its maximum and minimum acceptable pressures for control pressure 212. The former data provides for correction of overdriven or underdriven valves; the latter data provides for correction of excessive over or under pressurization. In a second mode, laboratory tested flow and torque measurements are collected for valve 214 and downloaded to storage 250 from master 206 through receiving circuit 228. Alternatively, the measured attribute may be stored in a non-volatile memory such as EEPROM and subsequently installed in positioner 210. Positioning is thereby tailored to the particular non-linearities of a valve to be used in the process. In a third mode of operation used for very precise positioning control, flow and torque attributes are initially stored in storage 250 and then dynamically updated while the valve is in operation. In this mode, a measured attribute is downloaded into storage 250 and then updated, point by point, as data is sampled at each point of operation. For all these modes, correction circuit 236 compares the stored attribute to the actual sensed physical parameter from sensing means 234 and compensates command output 231 accordingly. The stored attributes are updated dynamically during valve operation.

Figure 4:
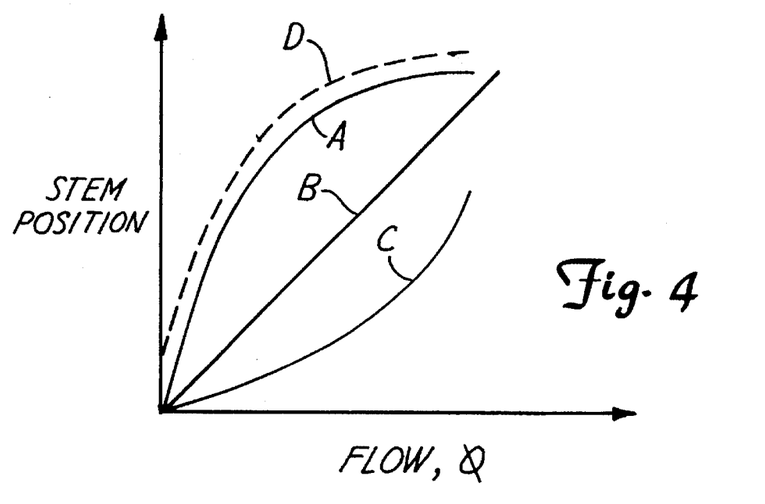
FIG. 4 is a plot of stem position as a function of flow for quick opening, linear and equal percentage valves.

One such stored attribute is the flow through valve 214 as a function of position. The flow is given by:

$$Q = C_v \sqrt{\frac{DP}{SG}}$$

where Q is the flow, $C_v$ is the valve coefficient, DP is the differential pressure across the valve and SG is the specific gravity of the fluid in the pipe. FIG. 4 shows three types of general flow versus position characteristics for quick opening, linear and equal percentage valves, labelled respectively at A, B and C. A set of curves as a function of specific gravity are stored in storage 250. Correction circuit 236 receives a signal representative of the sensed flow from transmitter 204 and compares the stored position corresponding to the sensed flow to the sensed position. Correction circuit compensates command output 231 for the deviation between the actual sensed position and the predicted position based on the sensed flow, using op-amp summing junction techniques. The effective bandwidth of the positioner may be lessened in this mode if the time required to request and receive the process variable is long compared to the response time for the positioner pneumatics. For implementations which impose significant transfer delays, such as a delay of 600 mS, the positioner bandwidth is necessarily lessened. However, when a communications protocol such as Fieldbus, which has a 1 mS request and retrieve time is employed, the target positioner bandwidth of 12 to 20 Hz is preserved.

Figure 5A:
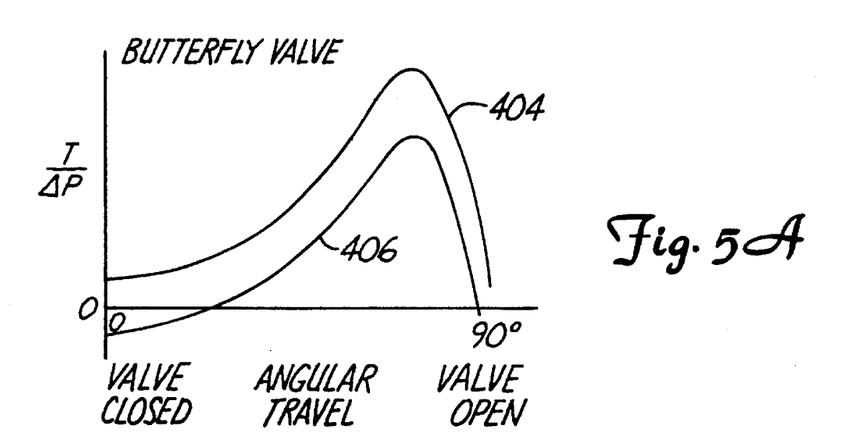
FIG. 5A is a plot of unit torque as a function of angular position for a butterfly valve.
Figure 5B:
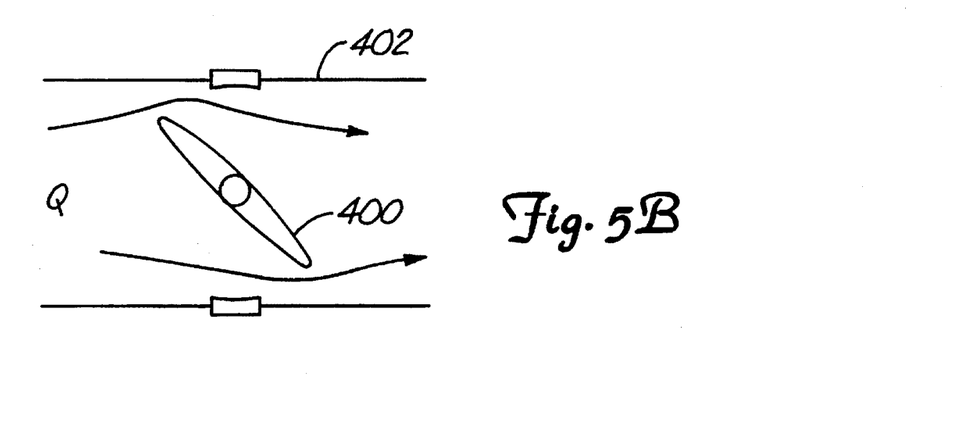
FIG. 5B is plan drawing of the butterfly valve in a pipe.

A second stored attribute is the torque versus position attribute of valve 214. As a positioner is an inherently non-linear device, it has difficulty controlling valve position in a non-linear part of the torque vs. position curve. For some rotary valves, torque vs. position is not only non-linear but non-monotonic. FIG. 5A shows a pair of torque versus angular travel attributes for a rotary valve 400 in a pipe 402, as shown in FIG. 5B. Torque as a function of angular travel for opening the valve is shown by curve 404, while valve closing attributes are shown by curve 406. The accuracy provided by this feature is especially useful for control valves which pivot about a central operating point, since they continuously switch between disjointed operating attributes and have special problems associated with their control. In this mode, correction circuit 236 receives a torque signal required to move the valve through a unit distance (for a stem valve), or unit angle (for a rotary valve) and compares it to the stored force required at the current sensed position or angle. Correction circuit 236 compensates command output 231 for the deviation between the actual sensed position and the predicted position based on the sensed force. A third stored attribute is the measured torque versus flow attribute of valve 214. In this mode, correction circuit 236 compares the sensed torque, as reported from load cell 242, to the stored torque at the desired flow Q, and compensates command output 231 for the difference.

Over time, the valve packing (shown at 244) degrades, and the seat (shown at 246) starts to leak, both of which change valve flow as a function of position. In this mode, the initial flow vs. position curve is stored in storage 250 as discussed earlier, but is dynamically updated. For example, when a position versus flow curve is selected, the sensed flow as reported from transmitter 204, at each new operating position is stored, so as to replace a previous operating point on the characteristic. Standard interpolation algorithms are used to interpolate between large discontinuities in the updated curve. As the flow and the corresponding sensed position output is stored over time, a new curve is constructed which reflects the dynamic flow versus position attributes of the positioner. Modification of these attribute curves over time makes dynamic correction, combined with real-time updating of the stored torque attribute, essential to accurate static positioning. Although the previous example shows a loop controlling flow, appropriate alterations to the same scheme are apparent for control of other physical variables such as temperature, pH, upstream and downstream process pressure and valve position at operating limits (e.g. limit switches).

Figure 6:
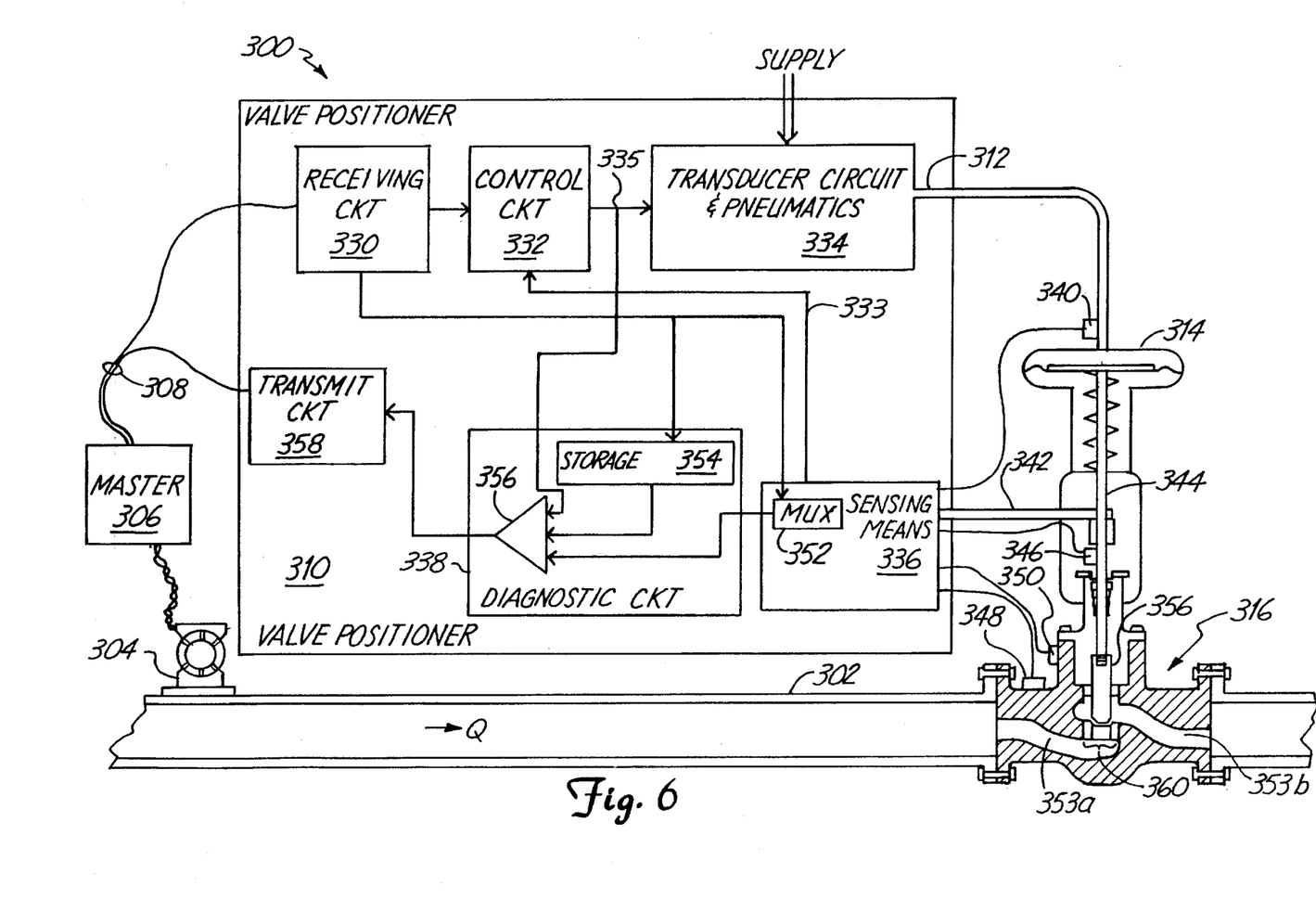
FIG. 6 is a block drawing of a valve positioner according to the present invention, connected to a master and an actuator mechanically coupled to a valve.

In FIG. 6, a control loop 300 including a transmitter 304, a master 306, a positioner 310, an actuator 314 and a valve 316 controls the flow Q in a pipe 302 in substantially the same way as discussed regarding FIG. 3. Positioner 310 comprises a receiving circuit 330, a transmit circuit 358, a control circuit 332, a transducer circuit and pneumatics 334, a sensing circuit 336 and a diagnostic circuit 338. Receiving circuit 330 communicates in substantially the same way as receiving circuit 228. Circuit 330 provides an output to a storage 354 for downloading valve attributes and another output to a mux 352 for selecting which of the sensed signals is selected for use in diagnostic circuit 338. Control circuit 332 receives both a position signal 333 representative of the valve position and a desired valve position signal from circuit 330 to provide an electrical command output 335 as a function of PID constants set in circuit 332. Transducer and pneumatics circuit 334 receives a 0–200 PSI supply of air and uses standard current-to-pressure technology to provide control pressure 312 at the positioner nozzle. Sensing circuit 336 is connected to a pressure sensor 340 for sensing a control pressure 312 at a nozzle output on positioner 310, a mechanical member 342 connected to a valve stem 344 for sensing the valve position, a load cell 346 for sensing force, an acoustic sensor 348 for sensing cavitation and valve packing noises and a fugitive emission sensor 350 for sensing vapors from organic chemicals in piping 302. Other sensors which sense physical parameters related to valve performance can be added, such as ones for sensing upstream and downstream temperature, process pressure and limit switches for sensing position at extreme open and closed positions or sensors which provide process variables to cascaded control loops. A multiplexer circuit 352 selects which of the sensor inputs is supplied to diagnostic circuit 338, as a function of a command received from circuit 330. A transmit circuit 358 transmits alarms and diagnostic data to master 306.

Diagnostic circuit 338 is preferably embodied in a CMOS low power microprocessor and includes non-volatile storage circuit 354 for storing physical parameters related to the valve. As appropriate, the characteristics are in the form of a range of acceptable values or a single expected value representative of a maximum limit. The expected values are downloaded to storage means 354 from master 306 over a two wire loop 308. Master 306 typically is a loop controller located in a control room, but may also be a hand-held communicator communicating communications protocols such as HART® or Fieldbus. A comparator 356 compares the expected physical parameter with the sensed physical parameter and provides a diagnostic output to transmit circuit 358. The diagnostic output may be an alarm or alert transmitted through circuit 358 to master 306 for immediate action, as when valve 314 is improperly positioned in a critical control loop, but may also be a value transmitted to master 306 on a regular basis, or available upon polling, so as to assess when maintenance is required.

Figure 7:
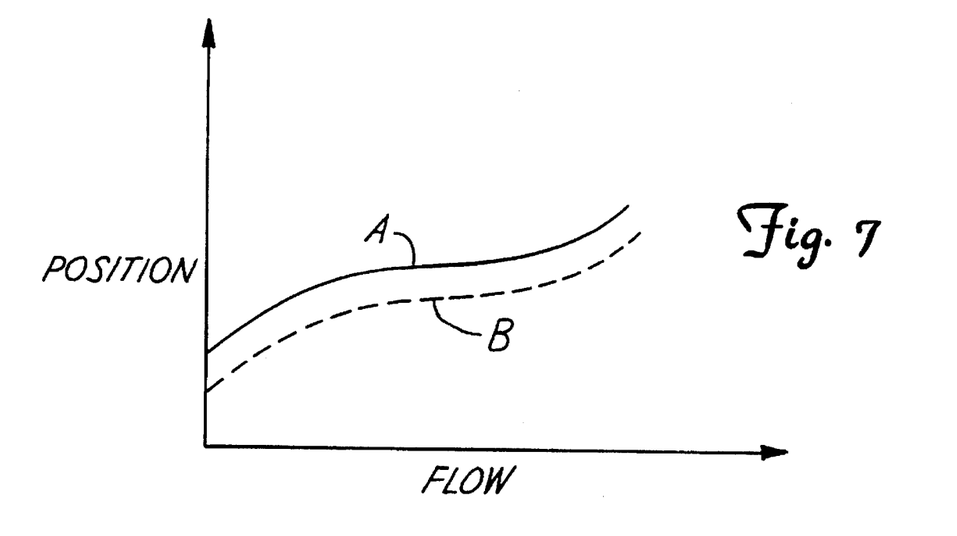
FIG. 7 is a plot of position versus flow as a function of valve seat wear.

Seat wear is also important in planning maintenance as it contributes to valve leakage. For example, valve seat leakage is particularly critical in quick opening valves or such valves which provide a significant change in flow for a small adjustment to valve position. Curve A on FIG. 4 shows a quick opening valve characteristic, which is translated upwards by a constant representative of the amount of leakage (see dashed curve D). Seat leakage occurs when fluid flows between passageways 353a,b when plug 360 is fully seated in seat 360. One way to assess leakage is to store a position value corresponding to a fully-seated valve as manufactured, or alternatively the seated position value at last maintenance. As valve seat 360 wears, plug 356 seats at progressively lower positions. The diagnostic circuit compares the sensed position value when the valve is seated to the stored seated position value. When the difference exceeds a stored limit, a valve seat wear value is transmitted to master 306. Another way to assess leakage is to compare a valve characteristic of valve 316 as originally manufactured, to another valve characteristic collected after wear has induced leakage. In FIG. 7, a position versus flow characteristic is shown at A for valve 316 as originally manufactured, or alternatively, as collected at a previous maintenance. After use, the dashed curve B represents the same characteristic collected at a later time. The characteristic is collected dynamically and constructed point by point at each position at which the valve is operated. The difference between the x-axis intercepts is representative of the leakage, which is reported to master 306 through circuit 358.

Figure 8:
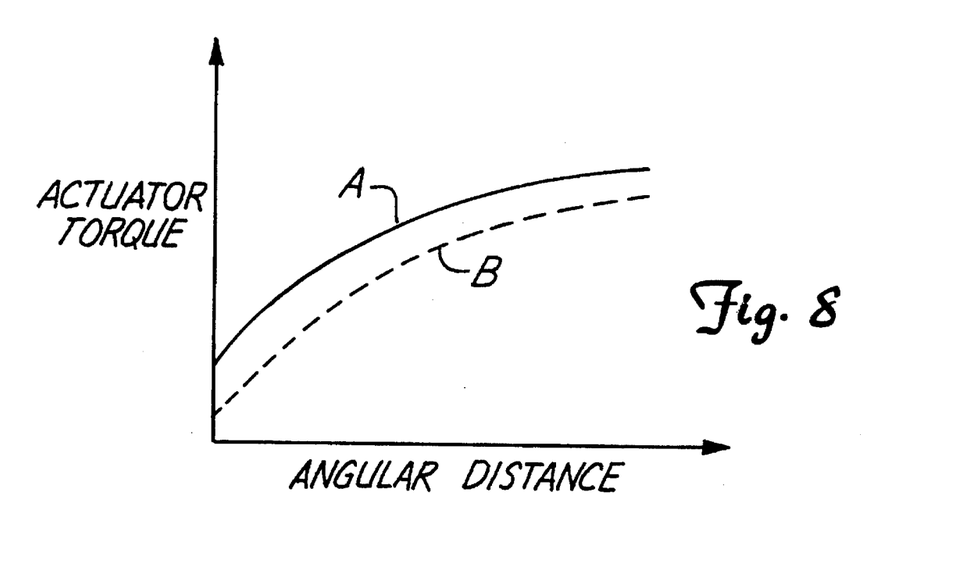
FIG. 8 is a plot of actuator torque versus angular distance travelled, as a function of valve seat wear.

Diagnosis of valve packing-related failures is also critical to proper valve maintenance. In this diagnostic mode, a value is stored in storage 354 representative of the cumulative distance at which the packing must be re-packed. The stored value is compared to the cumulative distance travelled, (degrees of travel for rotary valves) so that when the cumulative distance travelled exceeds the distance at which re-packing is required, circuit 358 transmits the diagnostic output to master 306. Another measure of packing and seat erosion is the degradation, over time, of the force required to unseat the valve. In FIG. 8, curve A represents the actuator torque versus angular distance of a valve as originally manufactured, or at a previous maintenance, and curve B represents the same characteristic at a later date. The difference in the x-axis intercept represents the difference in force required to unseat the valve. When the difference is greater than a stored limit, the actuator force value is transmitted to master 306.

Determining when the valve trim (i.e. valve stem and cage assemblies) is galling is also critical for planning maintenance. In this mode, the force signal is selected for use in diagnostic circuit 338 and compared to a value representative of an excessive amount of force. When the sensed force signal exceeds the stored force value, the force value is reported to master 306 through circuit 358. Another stored attribute is related to solenoid valves, which are either fully open or shut. They are common in critical control applications, where they bring the loop to a safe state. Solenoid valves are prone to undesirable sticking after long periods of non-use. In this mode, control circuit 332 sends out alternating open and shut position commands at a rate faster than that which the process responds, so that the solenoid valve will be able to operate when needed. When the sensed position signal in sensing circuit 336 indicates that the solenoid was unresponsive, a diagnostic message is sent to master 306. Another stored attribute is the concentration level of chemical emissions, measured initially after manufacture or during the last valve servicing. In this case, diagnostic circuit 338 receives the output from emissions sensor 350 and when the concentration of the organic chemical exceeds a stored limit, the concentration value is transmitted to master 306. Alternatively, a value representative of the chemical concentration is transmitted to master 306. Cavitation and the integrity of valve stem and cage assemblies (i.e. valve trim) may also be diagnosed using the present invention. When the frequency spectra from acoustic sensor 348 matches a stored frequency spectra representative of cavitation noise in pipe 302 or noise from the valve trim, a cavitation value or a trim wear value is reported to master 306 through circuit 358. Cavitation noise occurs at frequencies greater than 10 MHz, while trim vibration occurs in the 5–200 Hz range, and therefore is easily distinguishable from other pipe noises at lower frequencies. Broken actuator components can also be diagnosed. In this mode, a ruptured actuator diaphragm, a broken valve stem or plugged supply pressure is identified where the sensed position signal is constant when command output 335 changes. Diagnostic circuit 338 sends an alarm or alert when the sensed position signal is constant while command output 335 changes a predetermined amount over a specific time.

Thermal history also assists in planning preventive maintenance for valves components which fail frequently or which are time-consuming to repair, such as electronics components in positioners. In this mode, diagnostic circuit 338 logs different categories of thermal events in storage 354 and provides this data to master 306 through circuit 358. For example, certain positioner components have a predicted mean time between failure (MTBF) of 1.9 years when operated at 100% relative humidity and at a temperature of 150° F. Maintenance can be scheduled before the MTBF, 1.9 years, has elapsed since the last maintenance. Only a small portion of storage 354 is dedicated to this function, since the data is stored and uploaded at specific time intervals calculated to use only a portion of storage 354. Newly stored data is written over previous data. Positioner 310 also functions as a field mounted data logger. In this mode, circuit 338 logs relevant process variables for a short duration to record process dynamics and positioner response. The logged information is uploaded through circuit 358 to master 306, for process modeling and process upset correlation. Precise modeling is possible because both process and positioner dynamics are in a similar logging mode. State variables at the time of valve maintenance are recorded for uploading and planning maintenance.

Figure 9:
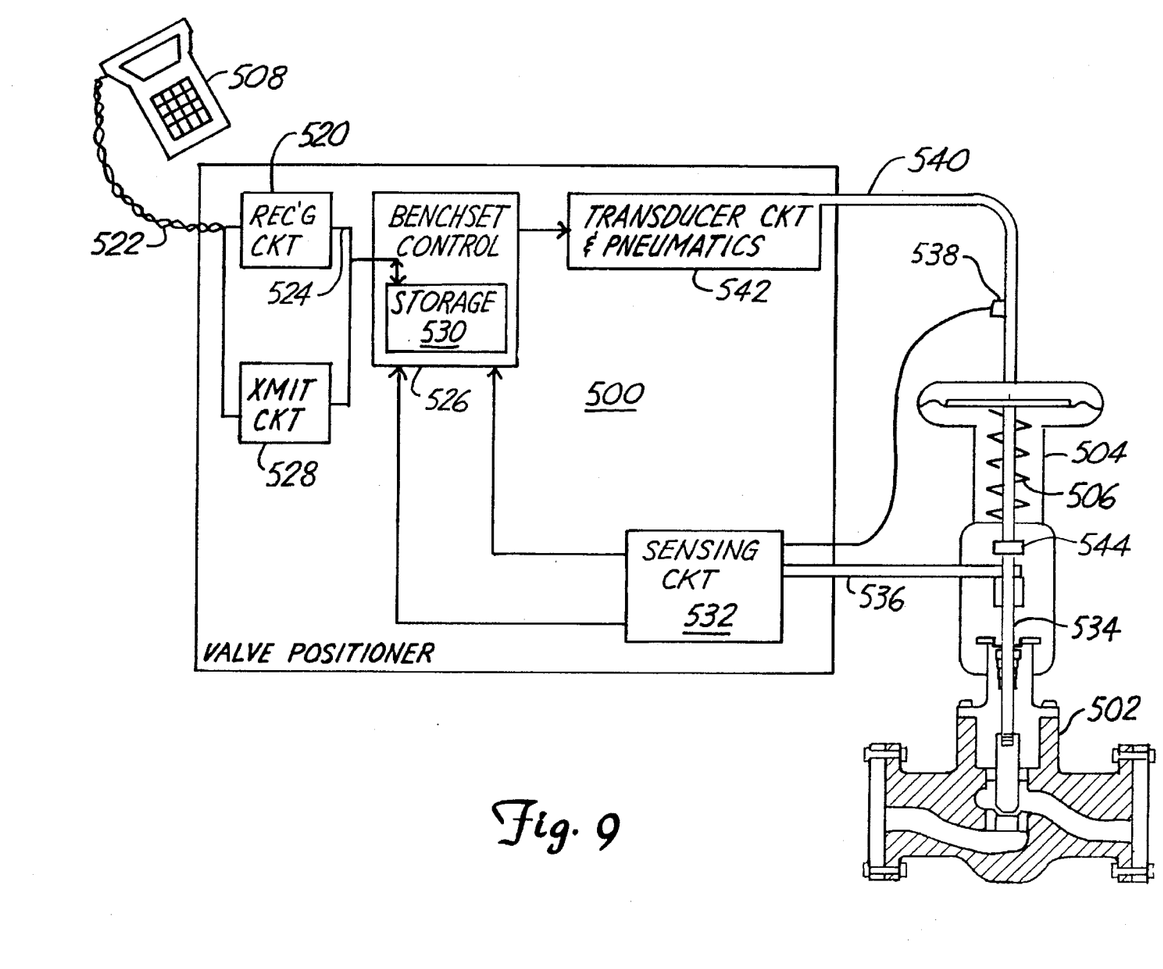
FIG. 9 is a block drawing of a valve position according to the present invention, communicating with a hand-held communicator and an actuator mechanically coupled to a valve.

In order to set the proper spring preload force in a positioner, a benchset operation is performed. Usual practice requires initial setting of the stroke position (i.e. 100% position), zero position, limit stops and the stiffness of the actuator spring so the valve is properly configured for the process it will control. This process is iterative and time consuming and typically takes between one and four hours to complete for prior art positioners, since the sensed stem position and the sensed control pressure are not available to the operator. In the present invention, benchset operations are more efficient and precise than before. In FIG. 9, a positioner 500 operates in a benchset mode, where it is connected to a valve body 502 mechanically coupled to an actuator 504 but disconnected from the process. Positioner 500 receives benchset commands from and transmits benchsetting parameters to hand-held communicator 508, or alternatively a properly configured PC. A receiving circuit 520 connected to a two wire cable 522 translates commands from communicator 508 and sends them to a common bus 524 connecting a benchset control circuit 526 and a transmit circuit 528 for translating bench set data into a format communicable to master 508. Control circuit 526 is preferably implemented as a CMOS microprocessor including a non-volatile storage 530, although it could be implemented in analog circuitry as well. Control circuit 526 provides an electrical command output to a transducer circuit and pneumatics section 542, which uses known I/P technology to produce control pressure 540. A sensing circuit 532 senses the position of a stem 534 in valve 502 via position sensor 536 and a pressure sensor 538 senses control pressure 540.

The first segment of a benchset operation calculates the spring constant of spring 506 while actuator 504 is disconnected so as to remove frictional effects. While positioner 500 is connected solely to valve 502, the operator sends a benchset command to circuit 526 through receiving circuit 520. Next, the operator enters into master 508 the desired initial control pressure, $P_0$, and the end control pressure $P_{100}$, for use in control circuit 526 via receiving circuit 520. Control circuit 526 commands pneumatics 542 to ramp between pressure $P_0$ and $P_{100}$ while sending the sensed position signal to master 508 for display through transmit circuit 528. Control circuit 526 stored the sensed position corresponding to pressures $P_0$ and pressure $P_{100}$, and stores them in storage 530. The spring constant $K_s$ is calculated in circuit 526 according to the equation:

$$K_S = \frac{(P_S - P_R) A_E - F_S - F_D}{y_s - y_0}$$

where $y_s$, is the valve position at 100% of stroke, $y_0$ is the valve position at 0% of stroke, $A_E$ is the effective area of the diaphragm, $P_S$ is the control pressure at 100% stroke and $P_R$ is the control pressure at 0% stroke. When fine control is required, the spring constant is calculated using an air spring constant as well. After connecting valve 502 to actuator 504, the frictional forces and the preload force on spring 506 is measured. The operator enters valve stem positions corresponding to 0% and 100% travel ($Y_0$ and $Y_{100}$), the line pressure in the installation, $P_L$, and a seating pressure safety factor, $S_M$, related to the amount of pressure which should be applied to valve 502 after the valve plug is seated. While circuit 526 sends a control signal to pneumatics 542 to cycle positioner 500 from 0% travel and 100% travel and back to 0%, the sensed control pressure is stored in storage 530 at various positions: $P_M$ is the control pressure just before the valve stem overcomes the frictional forces and moves, $P_R$ is the control pressure just after the stem has moved, $P_D$ is the control pressure at 25% of positional span with the stem moving towards the closed position, $P_U$ is the control pressure at 75% with the stem moving towards the fully open position and $F_i$ is the preload force on the spring, as sampled at 0% position. The force signal is most cost effectively and efficiently sampled by dividing the output from pressure sensor 538 by the area of the actuator diaphragm, AE, but alternatively may be derived from a load cell, not shown. Circuit 526 now calculates and stores the static frictional force, $F_s$, given by $$F_s = (P_M - P_R) A_E - F_D$$

and the dynamic frictional force opposing stem motion, $F_D$:

$$F_D = (P_D - P_U) \frac{A_E}{2}$$

The most time-consuming and iterative past of a bench set operation with a prior art positioner is for the operator to set the spring preload force by manually adjusting a nut 544 on the valve stem which changes the force on spring 506. However, a force balance equation can be derived for the positioner as connected to the actuator and valve and solved for the desired position, $Y_s$. The equation calculated in circuit 526 is:

$$y_s = \frac{F_f + F_i + P_L A_V - A_A(P_0 - P_{100})}{K_S} + y_0 - y_{100}$$

where all but $A_A$ (the effective area of the actuator diaphragm) are previously defined. The quantity $Y_s$ is the desired stem position at which nut 544 must be positioned in order to achieve the necessary preload force at specified control pressure and corresponding stem positions. During the manual adjustment of nut 544, the sensed position signal is transmitted through transmit circuit 528 to communicator 508, displayed as a percentage of the required stem travel adjustment. Although the present invention has been described with reference to preferred embodiments, workers skilled in the art will recognize that changes may be made in form and detail without departing from the spirit and scope of the invention.

What is claimed is:

1. A valve positioner for providing a control pressure to a valve actuator mechanically coupled to a valve, the positioner communicating with a master over a communications loop, comprising:

receiving means coupled to the communication loop for receiving an input representative of a desired valve position;

sensing means for sensing a set of physical parameters affecting the valve, the set of sensed physical parameters including a position of the valve;

control means coupled to the sensing means and the receiving means for providing a command output as a function of the desired valve position and the sensed valve position;

transducer means receiving a source of pressurized air and the command output, for providing the control pressure as a function of the command output; and correction means for storing a valve attribute of the valve which is affected by one of the physical parameters, the correction means compensating the command output as a function of the sensed physical parameter and the stored valve attribute.

2. The valve positioner of claim 1, where the receiving means is adapted to receive a valve attribute over the loop, and the stored valve attribute is the flow through the valve as a function of valve position, and where the correction means compensates the command output as a function of the sensed flow and the stored flow attribute.

3. The valve positioner of claim 1, where the sensing means include a sensor for sensing the force required to move the valve, and the stored attribute is the force attribute of the valve as a function of position, and where the correction means compensates the command output as a function of the sensed force and the stored force attribute.

4. The positioner of claim 1 where the input to the receiving means is a 4–20 mA current having a magnitude representative of the desired valve position.

5. The positioner of claim 1 where the input to the receiving means is formatted according to a digital communications protocol.

6. The positioner of claim 1 where the sensed position value is compensated for temperature effects.

7. The positioner of claim 1 where one of the set of sensed physical parameters is the control pressure, and where such control pressure is compensated for the air spring effect.

* * * * *